(12) United States Patent
Ando (10) Patent No.: US 7,676,684 B2
(45) Date of Patent: Mar. 9, 2010

(54) SEMICONDUCTOR DEVICE AND SIGNAL PROCESSING METHOD FOR SYNCHRONIZING DATA WITH A DATA STROBE SIGNAL

(75) Inventor: Naruyoshi Ando, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 841 days.

(21) Appl. No.: 11/495,776

(22) Filed: Jul. 31, 2006

(65) Prior Publication Data

US 2007/0240008 A1 Oct. 11, 2007

(30) Foreign Application Priority Data

Apr. 11, 2006 (JP) .............................. 2006-108996

(51) Int. Cl.
- G06F 1/12 (2006.01)
- G06F 1/00 (2006.01)
- G06F 1/04 (2006.01)
- G06F 13/00 (2006.01)

(52) U.S. Cl. ...................... 713/400; 713/500; 713/600; 711/100

(58) Field of Classification Search ................. 713/400, 713/500, 600; 711/100
See application file for complete search history.

(56) References Cited

U.S. PATENT DOCUMENTS

| | | | |
|---|---|---|---|
| 6,292,521 B1 * | 9/2001 | Lai et al. ..................... 375/357 |
| 6,321,343 B1 * | 11/2001 | Toda ........................... 713/600 |
| 6,369,601 B1 * | 4/2002 | Ishigaki ....................... 324/765 |
| 6,453,402 B1 * | 9/2002 | Jeddeloh ...................... 711/167 |
| 6,629,225 B2 * | 9/2003 | Zumkehr ...................... 711/167 |
| 6,920,526 B1 * | 7/2005 | Sikkink et al. .............. 711/109 |
| 7,062,625 B1 * | 6/2006 | Shrader et al. .............. 711/167 |
| 7,178,073 B2 * | 2/2007 | Dietrich et al. ............. 714/719 |
| 7,412,616 B2 * | 8/2008 | Matsui et al. ............... 713/401 |
| 7,478,287 B2 * | 1/2009 | Funaba et al. ............... 714/700 |
| 2005/0036349 A1 * | 2/2005 | Jakobs et al. ................. 365/51 |
| 2006/0112294 A1 * | 5/2006 | Walker ........................ 713/401 |

FOREIGN PATENT DOCUMENTS

| | | |
|---|---|---|
| JP | 2001-183422 | 7/2001 |
| JP | 2005-078547 | 3/2005 |

* cited by examiner

*Primary Examiner*—Ji H Bae
(74) *Attorney, Agent, or Firm*—Arent Fox LLP (57) ABSTRACT

In view of accurately determine a valid range of data to be synchronized to the system clock, conforming to actual environments of mounting and connection, the semiconductor device of the present invention is configured as acquiring flight times of clock signal(s) and a data strobe signal, transmitted to or from a double-data-rate memory, making use of reflected waves on transmission path, and as determining a valid range of data to be synchronized with a system clock based on thus-acquired flight times of the clock signal(s) and the data strobe signal.

13 Claims, 5 Drawing Sheets

SEMICONDUCTOR DEVICE AND SIGNAL PROCESSING METHOD FOR SYNCHRONIZING DATA WITH A DATA STROBE SIGNAL

CROSS-REFERENCE TO RELATED APPLICATIONS

This application is based upon and claims the benefit of priority from the prior Japanese Patent Application No. 2006-108996, filed on Apr. 11, 2006, the entire contents of which are incorporated herein by reference.

BACKGROUND OF THE INVENTION

1. Field of the Invention

The present invention relates to a semiconductor device and a signal processing method, and in particular those preferably adoptable to a semiconductor device having an interface relevant to a double-data-rate (DDR) synchronous dynamic random access memory (SDRAM).

2. Description of the Related Art

In circuit design of memory controller corresponded to DDR-SDRAM, DDR2-SDRAM and so forth, particular difficulties reside in a section allowing an internal flipflop to capture read data output from a memory, and a section taking part in synchronizing an output from the flipflop with a system clock. In determination of a valid range of data to be synchronized, it is important to calculate a round-trip delay which represents a length of time ranging from output of a clock from a memory controller, via travel through a memory (SDRAM), up to return of the clock as a data strobe signal DQS back to the memory controller. A timing design therefor, however, needs simulation and verification with an accuracy of several tens to several hundreds of picoseconds, and therefore needs an extremely long time for delay design of the memory controller and timing design of printed circuit board (PCB).

Memory element connected to the memory controller, quantity and types of DIMM modules, constitutional materials and number of layers of the printed circuit board are far from being unconditionally determined. Moreover, recent trends in DDR-SDRAM and DDR2-SDRAM are characterized by increased data rate evolving from DDR200, 266, 333 to 400, and from DDR2 400, 533 to 667. It is therefore difficult to simulate and verify every feasible memory-mounted configurations, over the entire regions covering all variations in the manufacturing and temperature conditions.

As for the memory controller for DDR-SDRAM, there has been proposed a method of adjusting timing by providing a capacitance corresponded to a memory element on a line simulating an actual PCB transmission path (printed wiring), actually reading the memory based on a dummy reading cycle, measuring the response waveform, and adjusting the phase of the data strobe signal DQS (see Patent Document 1, for example).

Patent Document 2 describes a technique of suppressing reflection of signals on a transmission line, ascribable to discontinuity or mismatching of characteristic impedance, and associated ringing.

[Patent Document 1] Japanese Patent Application Laid-Open No. 2005-78547

[Patent Document 2] Japanese Patent Application Laid-Open No. 2001-183422

The method described in Patent Document 1 adds a PCB line simulating an actual transmission path, and provides only a load capacitance as the load. The load capacitance connected via the transmission path is, therefore, largely restricted depending on which of a directly-coupled DRAM or a DTMM module is used, quantity of DRAM, rank of the DIMM module, number of components of the DIMM module and so forth, so that disagreement of as much as several tens to several thousands of picoseconds in delay may occur between such simulative transmission path simply having the load only and the actual transmission path.

The method is also disadvantageous in that it does not use an actual data strobe signal or a clock signal, and therefore does not conform to a geometry of an actual transmission path, so that flight times of the data strobe signal and the clock signal cannot be measured. Adoption of the dummy read cycle load undesirably complicates the design of the memory controller-related components, and actual circuit operation cannot be bested unless the memory is connected.

SUMMARY OF THE INVENTION

An object of the present invention resides in making it possible to accurately determining a valid range of data to be synchronized with the system clock, conforming to actual environments of mounting and connection.

A semiconductor device of the present invention has a flight time acquisition unit acquiring flight times of a clock signal and a data strobe signal transmitted to or from a double-data-rate memory, using a reflected wave; a calculation unit determining a valid range of data to be synchronized with a system clock, based on thus-acquired flight times of the clock signal and the data strobe signal; and a synchronizing unit synchronizing data in thus-determined valid range.

DETAILED DESCRIPTION OF THE PREFERRED EMBODIMENTS

Paragraphs below will describe an embodiment of the present invention, referring to the attached drawings.

First an outline of a memory controller LSI applied with the semiconductor device according to an embodiment of the present invention will be explained.

The memory controller LSI of this embodiment, as being mounted on a PCB board, delivers a search pulse on the actual PCB transmission paths (transmission paths respectively relevant to clock signals CK, CK# and a data strobe signal DQS), and measures a length of time up to detection of the reflected wave thereof. With respect to this process, the reflected wave is detected by using a bidirectional I/O (input/output circuit) so as to optimize a timing causative of skewing of the bidirectional I/O into a high-impedance state, and thereby creating a state of amplifying the reflected wave which appears on the PCB transmission path.

Next, the memory controller LSI determines the flight times of the actual clock signals CK, CK# and the data strobe signal DQS, based on correlations of the length of time up to detection of the reflected waves with the flight times of the clock signals CK, CK# and the data strobe signal DQS. The flight times are acquired based on a map or an equation showing correlation.

Next, the memory controller LSI calculates a round-trip delay based on the determined flight times of the clock signals CK, CK# and the data strobe signal DQS. The memory controller LSI determines a valid range of data to be synchronized using the round-trip delay.

(Principle of Acquisition of Flight Time of Data Strobe Signal DQS)

A principle of acquisition of the flight time of the data strobe signal DQS will be explained referring to FIGS. 1A to 1C.

Figure 1A:
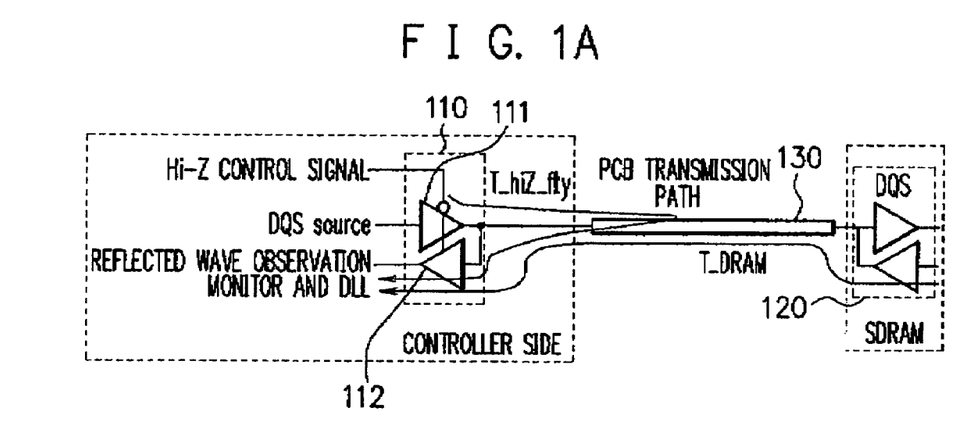
FIGS. 1A to 1C are drawings explaining a principle of acquisition of the flight time of the data strobe signal in an embodiment of the present invention.

FIG. 1A is a drawing showing a configuration taking part in transmission of the data strobe signal DQS.

In FIG. 1A, reference numeral 110 represents a bidirectional I/O owned by the controller-side component (memory controller LSI), reference numeral 120 represents a bidirectional I/O owned by the memory (SDRAM), and reference numeral 130 represents a PCB transmission path allowing therethrough transmission of the data strobe signal DQS between the controller side and the memory side.

The bidirectional I/O 110 has two buffers 111, 112. The buffers 111, 112 are so-called, tri-state buffers skewing the output into a high impedance (Hi-Z) state, depending on a high-impedance control signal.

The buffer 111 has the input end connected to a signal generation circuit of the data strobe signal DQS, and the output end connected to the PCB transmission path 130. The buffer 112 has the input end connected to the PCB transmission path 130, and the output end connected to a reflected wave observation monitor and a DLL (delay locked loop).

The bidirectional I/O 120 has, as illustrated in a simplified manner, two buffers capable of skewing the output into a high-impedance state, similarly to as the bidirectional I/O 110, wherein the input end of one buffer and the output end of the other buffer are connected to the PCB transmission path 130.

Figure 1B:
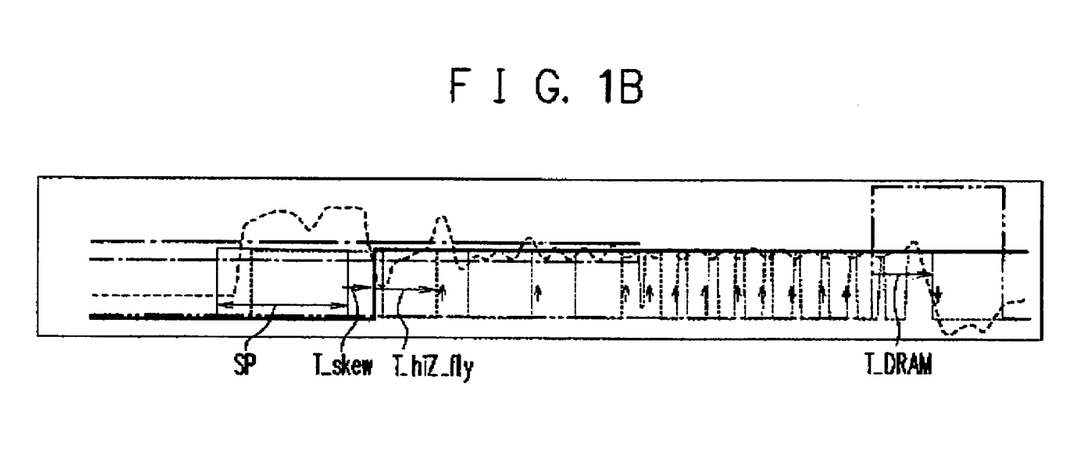

FIG. 1B is a drawing showing a signal form relevant to the PCB transmission path 130.

In measurement of the length of time up to detection of the reflected wave on the PCB transmission path 130, as shown in FIG. 1B, a search pulse, varying as "0"→"1"→"0" (that is, pulsive), is output from the controller side through the butter 111 in the bidirectional I/O 110. After completion of the output of the search pulse SP (transition point of "1"→"0"), the reflected wave is detected by skewing the output of the buffer 111 using the Hi-Z control signal. The length of time T_hiZ_fly up to detection of the reflected wave on the PCB transmission path 130 is observed based on the output of the Hi-Z control signal.

Observation of the reflected wave herein makes use of a controller-side internal terminal relevant to the data strobe signal DQS. If fluctuation as much as exceeding reference voltage (Vref)±threshold voltage [mV] occurs at the controller-side internal terminal as being overlaid with the reflected wave, an event of overlay of the reflected wave is sensible through changes (0/1) in the signal state. More specifically, the reflected wave observation time T_hiZ_fly is defined as a length of time ranging from output of the Hi-Z control signal, which brings the output of the buffer 111 into a high-impedance state, up to detection of changes in the state of the controller-side internal terminal.

It is known from FIG. 1B that waveform on the PCB transmission path 130 shows a large amount of ringing generated on the transmission path in a period during which data is transmitted on the transmission path for operation, as being triggered by delivery of the search pulse SP, because an electric charge having lost the destination thereof repeats reflection within the transmission path and thereby attenuates.

The amount of generation of the reflected wave is in a dependent relation with the length of time T_skew ranging from completion of output of the search pulse SP up to skewing of the buffer 111 of the bidirectional I/O 110 into a high-impedance state. In observation of the reflected wave, the length of time T_skew ranging from completion of output of the search pulse SP up to skewing of the buffer 111 into a high-impedance state is varied (swept), and the length of time in which the reflected wave is observed with a large frequency is determined.

Figure 1C:
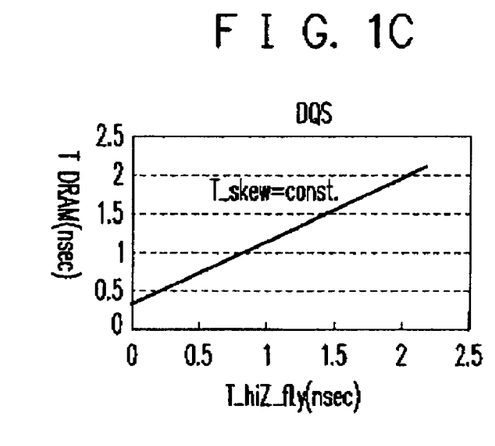

FIG. 1C is a drawing showing a correlation between the reflected wave observation time T_hiZ_fly (DQS) and the flight time T_DRAM (DQS), with respect to the data strobe signal DQS. When the length of the transmission path is varied in several ways, while keeping a constant length of time ranging from completion of output of the search pulse SP up to output of the Hi-Z control signal, that is the time T_skew, a relation between the reflected wave observation time T_hiZ_fly (DQS) and the flight time T_DRAM (DQS) of the data strobe signal DQS output from the memory (SDRAM) is proportional to the length of transmission path, as shown in FIG. 1C. By preparing such relationship for every varied time T_skew and keeping them in a form of table or equation, it is made possible to determine the flight time T_DRAM(DQS), based on the reflected wave observation time T_hiZ_fly (DQS).

(Principle of Acquisition of Flight Time of Clock Signals CK, CK#)

A principle of acquisition of the flight time of the clock signals CK, CK# will be explained referring to FIGS. 2A to 2C.

Figure 2A:
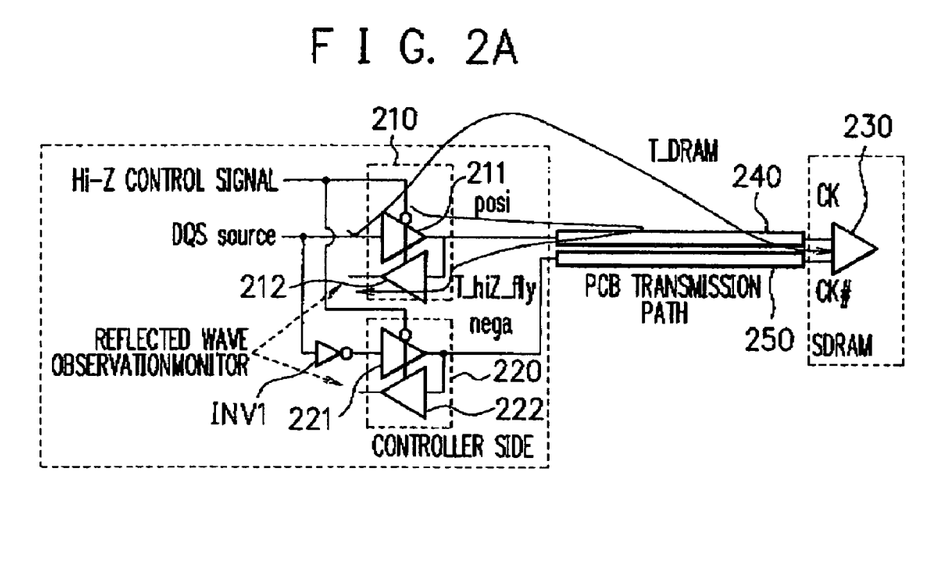
FIGS. 2A to 2C are drawings explaining a principle of acquisition of the flight time of the clock signal in the embodiment of the present invention.

FIG. 2A is a drawing showing a configuration taking part in transmission of the clock signals CK, CK#.

In FIG. 2A, reference numeral 210 represents a bidirectional I/O outputting the clock signal (positive clock signal) CK owned by the controller-side component (memory controller LSI), and reference numeral 220 represents a bidirectional I/O outputting the clock signal (negative clock signal) CK# owned by the controller-side component. The reference numeral 230 represents a clock buffer owned by the memory (SDRAM), and reference numerals 240, 250 represent PCB transmission paths allowing therethrough transmission of the clock signals CK, CK# from the controller side towards the memory.

Although general output of the clock signals CK, CK# uses an output-dedicated differential I/O having no Hi-Z state, this embodiment adopts the bidirectional differential I/O having the Hi-Z state, configured by the bidirectional I/Os 210, 220 and an inverter INV1, in order to make it possible to observe the reflected wave.

The bidirectional I/O 210 has two buffers 211, 212. The buffers 211, 212 are so-called, tri-state buffers skewing the output into a high impedance (Hi-Z) state, depending on a high-impedance control signal. The buffer 211 has the input end connected to a signal generation circuit of the clock signal CK, and the output end connected to the PCB transmission path 240. The buffer 212 has the input end connected to the PCR transmission path 240, and the output end connected to a reflected wave observation monitor.

Similarly, the bidirectional I/O 220 has two buffers 221, 222. The buffers 221, 222 are so-called, tri-state buffers skewing the output into a high impedance (Hi-Z) slate, depending on a high-impedance control signal, The buffer 221 has the input end connected via the inverter INV1 to a signal generation circuit of the clock signal CK, and the output end connected to the PCB transmission path 250. The buffer 222 has the input end connected to the PCB transmission path 250, and the output end connected to a reflected wave observation monitor.

Figure 2B:
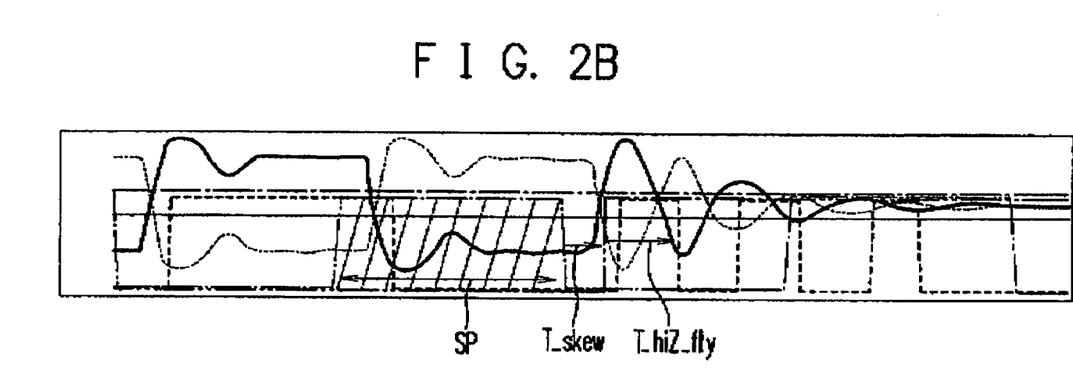

FIG. 2B is a drawing showing a signal form relevant to the PCB transmission paths 240, 250.

In measurement of the length of time up to detection of the reflected wave on the PCB transmission paths 240, 250 as shown in FIG. 2B, a search pulse SP, varying as "0"→"1"→"0" ("1"→"0"→"1") is output from the controller side through the buffer 211 (221) in the bidirectional I/O 210 (220). After completion of the output of the search pulse SP, the reflected wave is detected by skewing the outputs of the buffers 211, 221 using the Hi-Z control signal. The length of time T_hiZ_fly up to detection of the reflected wave on the PCB transmission paths 240, 250 is observed based on the output of the Hi-Z control signal.

It is to be noted that the reflected wave on the PCB transmission paths 240, 250 should be observed by interrupting supply of the clock signals CK, CK# through the PCB transmission paths 240, 250, to the memory (SDRAM). It is, therefore, preferable to observe the reflected wave on the PCS transmission paths 240, 250 as a part of calibration before allowing the memory to proceed initial operation, in a period during which clock supply to the memory can be interrupted and the memory is not accessed (for example, after power-on-resetting upon power-on).

Observation of the, reflected wave herein makes use of a controller-side internal terminal relevant to the clock signals CK, CK#. An event of overlay of the reflected wave is sensible through changes (0/1) in the signal state at the controller-side internal terminal. More specifically, the reflected wave observation time T_hiZ_fly is defined as a length of time ranging from output of the Hi-Z control signal, which brings the output of the buffer 211, 221 into a high-impedance state, up to occurrence of changes in the state of the controller-side internal terminal.

It is known from FIG. 2B that, in the period of operation of the clock signals CK, CK#, the switching of the output of the buffers 211, 221 while keeping the high-level/low-level potential on the transmission paths, ringing occurs due to an electric charge having lost the destination thereof. Also as for the clock signals CK, CK#, a dependent relation resides in the time T_skew ranging from the 0/1 transition point up to the time when the buffers 211, 221 of the bidirectional I/Os 210, 220 are brought into a high-impedance state. In observation of the reflected wave, the length of time T_skew ranging from completion of output of the search pulse SP up to skewing of the buffers 211, 221 into a high-impedance state is varied (swept), and the length of time in which the reflected wave is observed with a large frequency is determined.

Figure 2C:
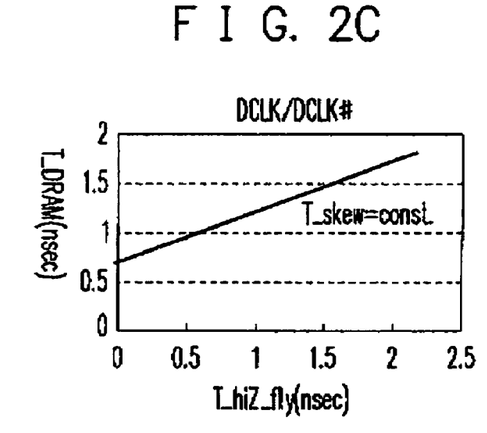

FIG. 2C is a drawing showing a correlation between the reflected wave observation time T_hiZ_fly (CK) and the flight time T_DRAM (CK), in relation to the clock signals CK, CK#. When the length of the transmission path is varied in several ways, while keeping a constant length of the time T_skew, a relation between the reflected wave observation time T_hiZ_fly (CK) and the flight time T_DRAM (CK) of the clock signals CK, CK# supplied from the controller-side to the memory (SDRAM) is proportional to the length of transmission path, as shown in FIG. 2C. By preparing such relationship for every varied time T_skew and keeping them in a form of table or equation, it is made possible to determine the flight time T_DRAM (CK), based on the reflected wave observation time T_hiZ_fly (CK).

Figure 3:
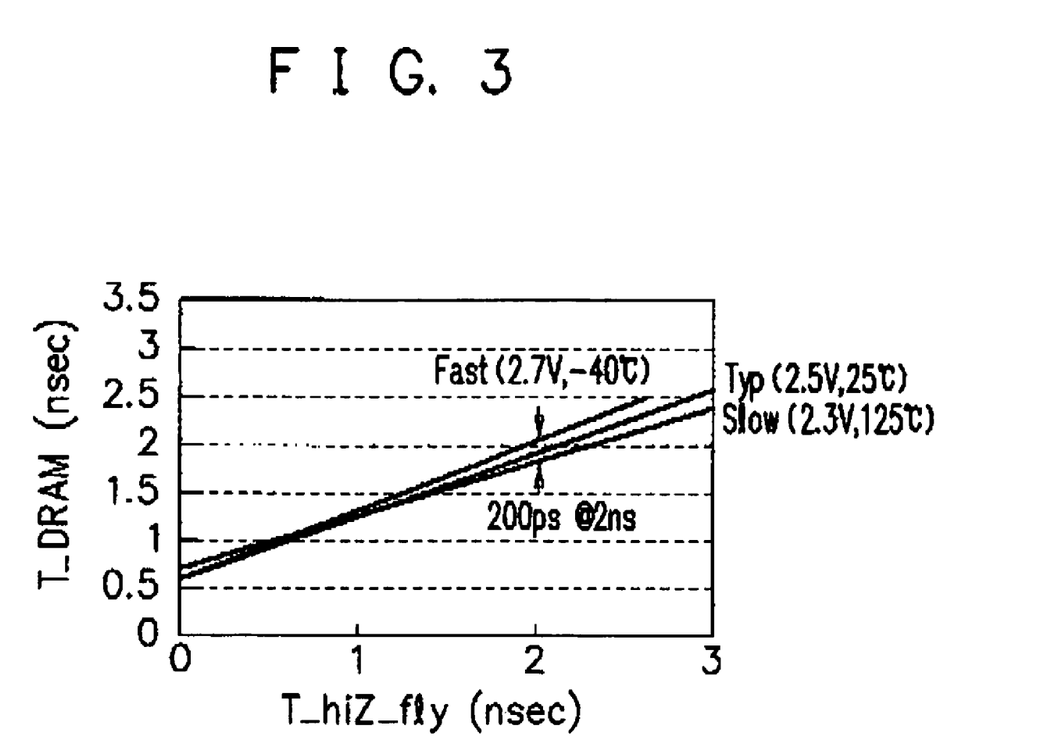
FIG. 3 is a drawing showing correlations between the reflected wave observation time and the flight times relevant to the data strobe signal, in relation to process variations.

FIG. 3 is a drawing showing correlations between the reflected time observation time T_hiZ_fly (DQS) and the flight times T_DRAM (DQS) with respect to the data strobe signal DQS, in relation to process variations. Both of the ordinate and abscissa represent delays in the same I/O cell, so that, assuming now that only a small variation resides in the I/O cell, it is allowable enough for the input delay and output delay of the I/O to consider only variations among chips, among wafers, and among production lots, so that the delays can be understood as being dependent only on the length of the transmission path. A simulation showed that, on the transmission path (approximately 10 cm long from the controller to the memory) allowing the flight time of as short as 2 ns, fast-slow difference falls on 200 ps or shorter, and can be understood that the relation between the reflected wave observation time T_hiZ_fly (DQS) and The flight time T_DRAM (DQS) can unconditionally be determined depending on the length of the transmission path. The same will apply also to the relation between the reflected wave observation time T_hiZ_fly (CK) and the flight time T_DRAM (CK) with respect to the clock signals CK, CK#.

Figure 4:
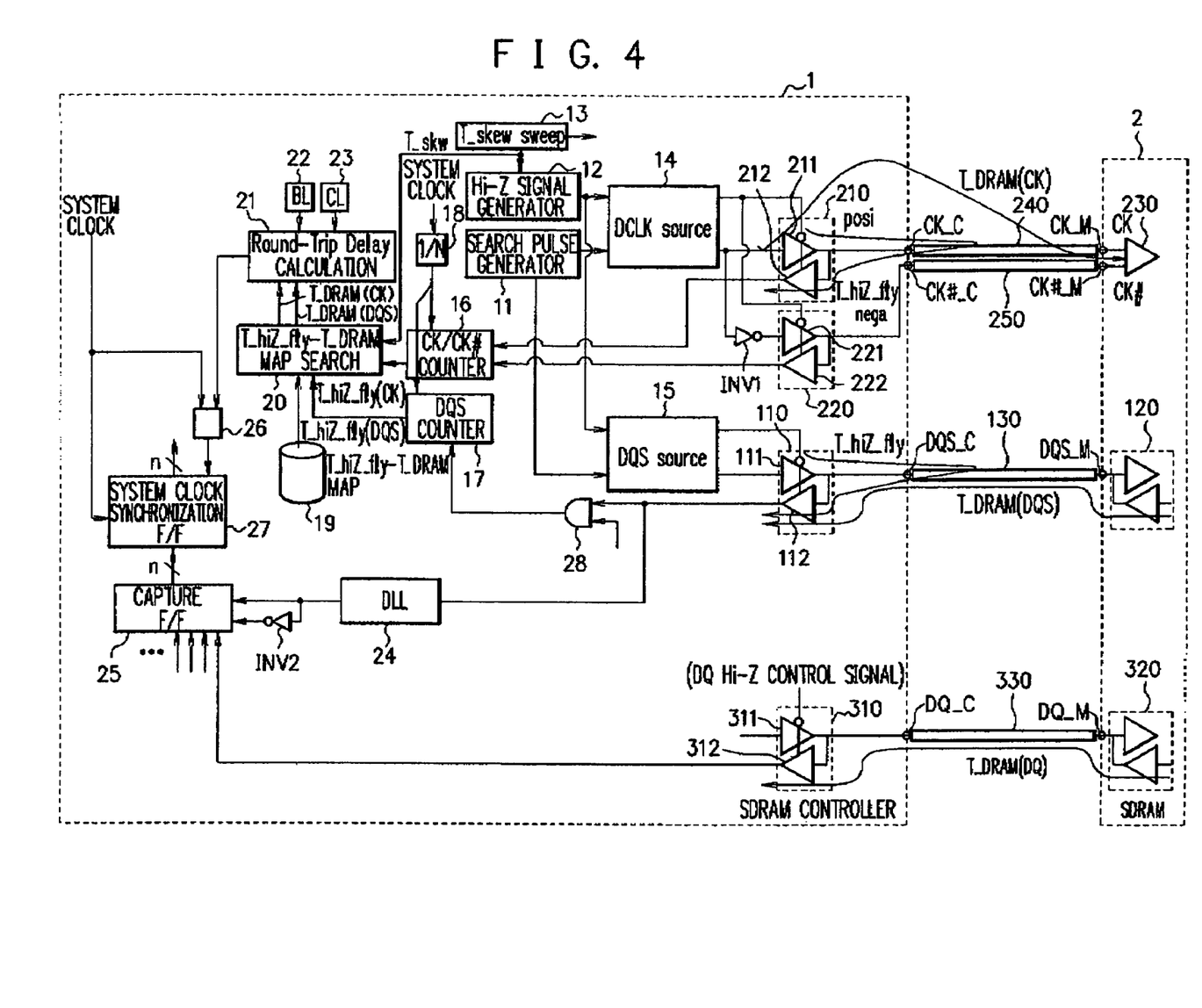
FIG. 4 is a drawing showing an exemplary configuration of a memory controller LSI in the embodiment.
Figure 5:
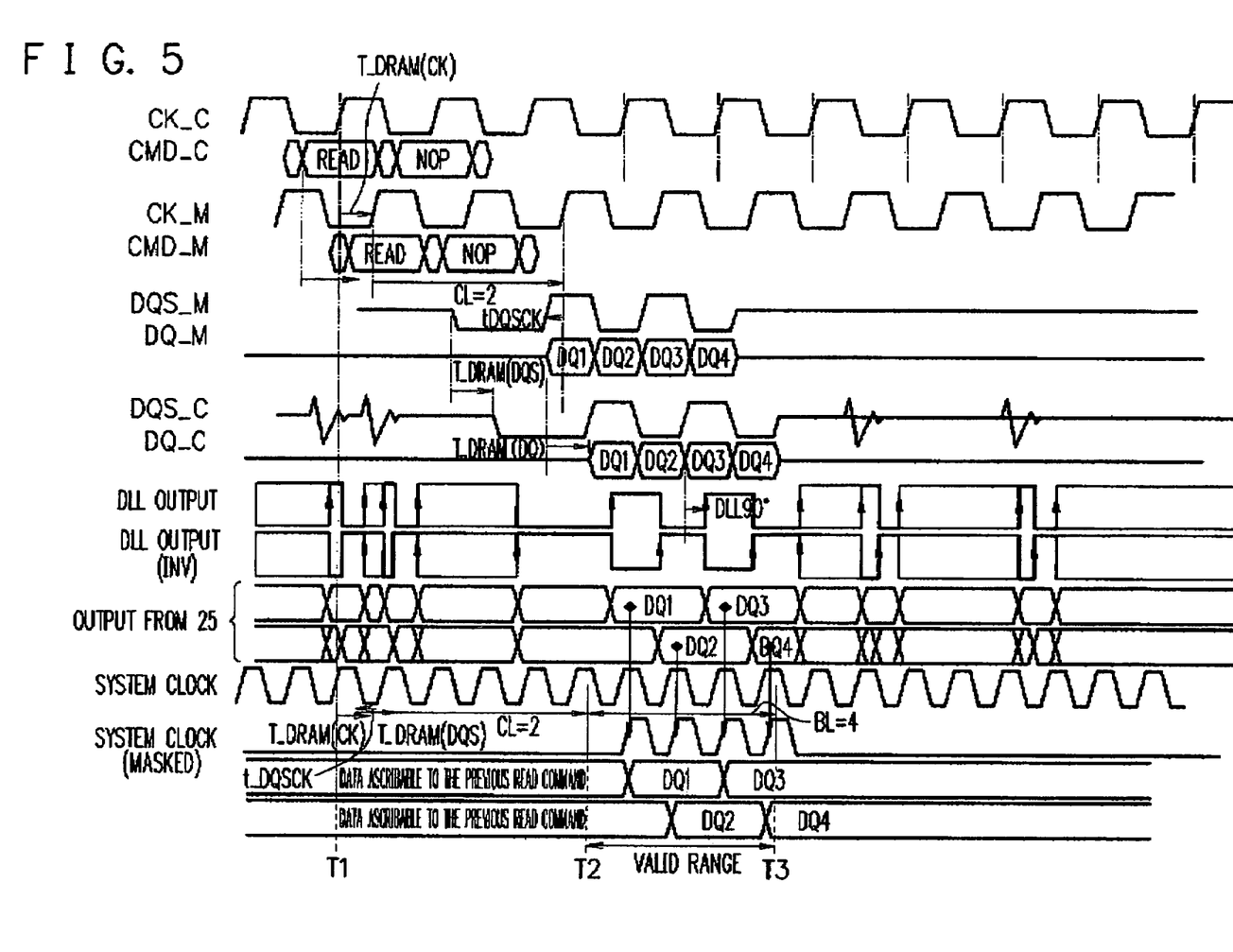
FIG. 5 is a timing chart showing read operation of the memory controller LSI in the embodiment.

FIG. 4 is a drawing showing an exemplary configuration of the memory controller LSI 1 of this embodiment, and FIG. 5 is a timing chart showing read operation of the memory controller LSI 1 of this embodiment.

As shown in FIG. 4, the memory controller LSI 1 is configured as being connectable via the PCB transmission paths 130, 240, 250, 330 to the double-data-rate memory (SDRAM) 2. It is to be noted that, between the memory controller 1 and the memory 2, other control signals (commands), although not illustrated, are transmitted through the PCB transmission paths.

In the memory controller 1, reference numeral 11 represents a search pulse generator generating the search pulse SP to be output to the PCB transmission paths, reference numeral 12 represents an Hi-Z signal generator generating the Hi-Z control signal to be output to the bidirectional I/Os 110, 210, 220, and reference numeral 13 is a skew control circuit controlling the time T_skew ranging from completion of output of the search pulse SP up to outputting the Hi-Z control signal by the Hi-Z signal generator 12. Reference numeral 14 represents a clock signal generator generating the clock signal CK, and reference numeral 15 is a strobe signal generator generating the data strobe signal DQS.

Reference numeral 16 represents a counter measuring the reflected wave observation time T_hiZ_fly (CK) on the PCB transmission paths 240, 250, and reference numeral 17 represents a counter measuring the reflected wave observation time T_hiZ_fly (DQS) on the PCB transmission path 130. The counters 16, 17 operate according to a clock signal faster enough than the system clock signal, obtained by (1/N)-fold multiplication of the system clock signal by a multiplier 18.

Reference numeral 19 represents a memory unit storing maps (tables) indicating relations between the reflected wave observation time T_hiZ_fly and the flight time T_DRAM, with respect to the time T_skew relevant to the clock signals CK, CK# and the data strobe signal DQS, and is configured typically by RAM, ROM or the like.

Reference numeral 20 is a map search unit searching, based on information of the time T_skew supplied from the skew control circuit 13, a map corresponded to the T_skew from the memory unit 19. The map search unit 20 refers the map thus obtained by searching, and determines and outputs the flight time T_DRAM based on the reflected wave observation time T_hiZ_fly supplied from the counters 16, 17.

Reference numeral 21 represents a delay calculation unit calculating a round-trip delay. The delay calculation unit 21 calculates round-trip delay based on the flight time T_DRAM (CK) output from the map search unit 20, T_DRAM (DQS), burst length (BL) stored in the control registers 22, 23, and CAS latency (CL). The delay calculation unit 21 still also determines a valid range of data to be synchronized, using thus-calculated, round-trip delay, generates a mask signal indicating the range, and outputs it.

Reference numeral 24 represents a DLL (delay locked loop) outputting the data strobe signal DQS received from the memory 2, after shifting the phase thereof by 90°, and reference numeral 25 represents a capture flipflop capturing data received from the memory 2, using output of the DLL 24 and output of an inverter INV2 (the inverted output of DLL 24).

Reference numeral 26 represents a clock buffer masking and outputting the system clock based on the mask signal sent from the delay calculation unit 21, and is typically configured using a logic circuit such as AND gate. Reference numeral 27 is a synchronization flipflop synchronizing a valid data output from the capture flipflop 25 with the system clock, based on The masked system clock output from the clock buffer 26.

Reference numeral 110 represents a bidirectional I/O relevant to the data strobe signal DQS, and has two buffers 111, 112 skewing the output into a high-impedance state corresponding to the Hi-Z control signal. The buffer 111 has the input end connected to the strobe signal generator 15, and the output end connected via a terminal DQS_C to the PCB transmission path 130. The buffer 112 has the input end connected via a terminal DQS_C to the PCB transmission path 130, and the output end connected to the counter 17 and the DEL 24.

Reference numeral 210 represents a bidirectional I/O relevant to the clock signal CK, and has two buffers 211, 212 skewing the output into a high-impedance state corresponding to the Hi-Z control signal. The buffer 211 has the input end connected to the clock signal generator 14, and the output end connected via the terminal CK_C to the PCB transmission path 240. The buffer 212 has the input end connected via the terminal CK_C to the PCB transmission path 240, and the output end connected to the counter 16.

Similarly, reference numeral 220 represents a bidirectional I/O relevant to the clock signal CK#, and has two buffers 221, 222 skewing the output into a high-impedance state corresponding to the Hi-Z control signal. The buffer 221 has the input end connected via the inverter INV1 to the clock signal generator 14, and The output end connected via the terminal CK#_C to the PCB transmission path 250. The buffer 222 has the input end connected via the terminal CK#_C to the PCB transmission path 250, and the output end connected to the counter 16.

Reference numeral 310 represents a bidirectional I/O relevant to a data signal DQ, and has two buffers 311, 312 skewing the output into a high-impedance state corresponding to the Hi-Z control signal. The buffer 311 has the output end connected via the terminal DQ_C to the PCB transmission path 330. The buffer 312 has the input end connected via the terminal DQ_C to the PCB transmission path 330, and the output end connected to the capture flipflop 25. Although the drawing shows only one bidirectional I/O relevant to the data signal DQ, it is a matter of course that a plurality of bidirectional I/O are provided depending on the data width.

Reference numeral 120 represents a bidirectional I/O relevant to the data strobe signal DQS, connected via a terminal DQS_M to the PCB transmission path 130. Reference numeral 230 represents a clock buffer relevant to the clock signals CK, CK#, connected via terminals CK_M, CK#_M to The PCB transmission paths 240, 250, respectively. Reference numeral 320 represents a bidirectional I/O relevant to the data signal DQ, connected via a DQ_M to the PCB transmission path 330.

Operations will be explained in the next.

First, typically in an initializing sequence or the like such as in a state immediately after the power-on, wherein the memory 2 is not supplied with the clock signals CK, CK#, the search pulses SP relevant to the clock signals CK, CK# and the data strobe signal DQS are delivered to the PCB transmission paths, and response from the transmission paths is investigated.

The memory controller LSI 1 allows the search pulses generator 11 to deliver the search pulse SP, via the clock signal generator 14 and the bidirectional I/Os 210, 220, to the transmission paths 240, 250 for the clock signal CK, CK#, detects the reflected waves, and allows the counter 16 to count them, to thereby measure the reflected wave observation time T_hiZ_fly (CK). The measurement of the reflected wave observation time T_hiZ_fly (CK) herein is conducted while varying the time T_skew ranging from completion of output of the search pulse SP up to skewing of the outputs or the buffers 211, 221 of the bidirectional I/Os 210, 220 to Hi-Z.

Similarly, the memory controller LSI 1 allows the search pulse generator 11 to deliver the search pulse SP, via the strobe signal generator 15 and the bidirectional I/O 110, to the transmission path 130 for the data strobe signal DQS, detects the reflected wave, and allows the counter 16 to count it, to thereby measure the reflected wave observation time T_hiZ_fly (CK). The measurement of the reflected wave observation time T_hiZ fly (CK) herein is conducted while varying the time T_skew ranging from completion of output of the search pulse SP up to skewing of the outputs of the buffer 111 of the bidirectional I/O to Hi-Z.

Next, the map search unit 20 searches and acquires a desired map from the memory unit 19 based on information of the time T_skew supplied from the skew control circuit 13, and respectively determines flight times T_DRAM (CK), T DRAM (DQS), based on the measured reflected wave observation times T_hiZ_fly (CK), T_hiZ_fly (DQS). The equation used herein may be an approximate expression such as T_DRAM=α×T_hiZ_fly+β (α, β are arbitrary constants).

It is to be noted that the map search unit 20 may respectively determine flight times T_DRAM (CK), T_DRAM (DQS) using an equation calculating the flight time T_DRAM based on the reflected wave observation time T_hiZ_fly, in place of losing a map indicating a relation between the reflected wave observation time T_hiZ_fly and the flight time T_DRAM.

Next, the delay calculation unit 21 determines round-trip delay and a valid range of data to be synchronized, based on the flight times T_DRAM (CK), T_DRAM (DQS) determined by the map search unit 20, the burst length (BL), the CAS latency (CL) and so forth.

The round-trip delay and the valid range of data to be synchronized can be determined as follows.

$$T\_valid\_start = T\_DRAM(CK) + t\_DQSCK(DRAM\ standard) + T\_DRAM(DQS) + CL$$

$$T\_valid\_end = T\_valid\_start + BL$$

where, t_DQSCK is a value determined by the standard of the memory, CL is a time corresponded to the CAS latency, and BL is a time required for transmitting data having the burst data length.

T_valid_start is none other than the round-trip delay, and corresponds to the start point of the valid range of data to be synchronized. The T_valid_end corresponds to the end point of the valid range of data to be synchronized.

Read operation of the memory controller LSI 1 will be explained below, referring to FIG. 5.

First at time T1, the memory controller LSI 1 issues a read command to the memory 2. The clock signals CK, CK# supplied from the memory controller LSI 1 to the memory 2 reach the memory 2 after an elapse of flight time T_DRAM (CK) of the clock signals CK, CK#. Also the read command reaches the memory 2 after the elapse of flight times of address and command.

Upon reception of the road command from the memory controller LSI, the memory 2 outputs the data strobe signal DQS and The data signal DQ, after the elapse of time specified as the CAS latency, and after the AC standard value (tDQSCK, ±0.75 ns for example) of the memory 2.

In general, the double-data-rate memory (SDRAM) realizes equal-length, equal-delay interconnection for every data strobe signal DQS group, so that approximate flight time is equalized between the data strobe signal DQS and the data signal DQ. The data strobe signal DQS and the data signal DQ output from the memory 2 therefore reach the memory controller LSI 1 after the elapse of flight time T_DRAM (DQS).

The data strobe signal DQS received from the memory 2 is added with a certain delay by the DLL 24, and supplied to the capture flipflop 25. Output of the DLL 24 is also inverted by the inverter INV2, and then supplied to the capture flipflop 25. It is to be noted herein that the amount of delay added by the DLL 24 is such as given by shifting the phase by 90°, so as to make the edge of the data strobe signal fall on the center of the data signal DQ. It is also allowable to add a certain delay to the input data strobe signal DQS by a delay line, in place of DLL 24.

The data signal DQ received from the memory 2 is supplied to the capture flipflop 25, captured by the capture flipflop 25 based on an output signal of the DLL 24 and an inverted signal thereof, and output therefrom.

The output signal of the DLL 24 and the inverted signal thereof may undesirably overlaid with noise on the transmission path in the high-impedance state. Capture of the data signal DQ using such signal as the strobe signal makes it difficult to discriminate meaningful valid data from meaningless invalid data ascribable to the noise.

When the output of the capture flipflop 25 is captured by the synchronization flipflop 27 so as to synchronize the output with the system clock, it is designed that only data within a range determined by the T_valid_start and the T_valid_end obtained as described in the above is captured. More specifically, a mask signal is generated by the delay calculation unit 21, and the system clock to be supplied to the synchronization flipflop 27 is masked (made valid) only within a period from the T_valid_start to the T_valid_end representing a valid range of data to be synchronized.

As a consequence, the system clock for synchronization kept in valid only within a period between the time T2, after the elapse of T_valid_start from the time T1, and T3, after the elapse of time corresponded to the burst length from the time T2, is input to the synchronization flipflop 27. By capturing the output of the capture flipflop 25 using thus-masked system clock, the synchronization flipflop 27 can extract data within the valid range out of data string having valid data and invalid data mixed therein, and can synchronize it.

As has been described in the above, this embodiment can determine propagation delay of the clock signals CK, CK# and the data strobe signal DQS, in the state that the memory controller LSI is actually mounted and connected to the memory, and using the transmission paths allowing the signals to actually flow therethrough, so that it is made possible to determine the propagation delay of the clock signals CK, CK# and the data strobe signal DQS on the actual transmission paths, even in a variety of structures and configurations having a variable quantity of DRAM chips, a variable number of layers of PCB board, a variable length of the transmission path and so forth. As a consequence, it is made possible to accurately determine the valid range of data to be synchronized without paying attention to process variation, DRAM configuration and length of transmission path, to extract a valid range of data to be synchronized to the system clock, and to synchronize it.

The memory controller LSI in the above-described embodiment can be realized by adopting a known memory controller circuit without modification, and by providing an additional circuit to an I/O port block outputting the data strobe signal DQS and the clock signals CK, CK#. It is therefore made possible to readily and accurately determine the valid range of data to be synchronized, conforming to actual environments of mounting and connection, while minimizing influence on already-provided port sections.

In this embodiment described in the above, the reflected wave is observed after being amplified by varying (sweeping) the T_skew. It is therefore made possible to obtain the reflected wave, conversely even for the time T_skew where the reflected wave is less readily observed, or for the time causing only a small reflection. Therefore in the normal operation, it is also allowable to realize a noise-robust transmission, by controlling the bidirectional I/Os relevant to the data strobe signal and the data signal based on the time T_skew causing only a small reflection.

It is to be understood that the above-described embodiment is merely an exemplary materialization carrying out the present invention, by which the technical scope of the present invention should not limitatively interpreted. That is, the present invention can be embodied in a variety of modes without departing from the technical spirit and principal features thereof.

The present invention determines the valid range of data to be synchronized using the flight times of the clock signal and the data strobe signal acquired in an actual state of mounting and using an actual transmission path, so that data to be synchronized can accurately be determined conforming to actual environments of mounting and connection, and only data in the valid range can be synchronized with the system clock.

What is claimed is:

1. A semiconductor device having an interface relevant to a double-data-rate memory, comprising:
    a flight time acquisition unit acquiring flight times of a clock signal and a data strobe signal transmitted to or from the memory, using a reflected wave on a transmission path of said signals;
    a calculation unit determining a valid range of data to be synchronized with a system clock, based on the flight times of the clock signal and the data strobe signal acquired by said flight time acquisition unit; and
    a synchronizing unit synchronizing data in the valid range determined by said calculation unit, wherein the flight time acquisition unit includes:
an observation time measuring unit observing the reflected wave on the transmission path of said signals, and measuring observation times; and
a flight time output unit acquiring the flight times of said clock signal and said data strobe signal, based on the observation times obtained by said observation time measuring unit, and using a prepared table or an equation showing correlation between said observation times and said flight times.

2. The semiconductor device according to claim 1, wherein the flight time of said clock signal is acquired when the semiconductor device is powered on.

3. The semiconductor device according to claim 1, wherein said calculation unit calculates a round-trip delay based on the flight times of the clock signal and the data strobe signal acquired by said flight time acquisition unit, and uses it to determine the valid range of data to be synchronized.

4. The semiconductor device according to claim 1, further comprising:
a clock masking unit masking said system clock using a mask signal generated by said calculation unit and outputting the masked system clock to said synchronizing unit, and wherein said calculation unit generates said mask signal indicating said valid range of data.

5. A semiconductor device having an interface relevant to a double-data-rate memory, comprising:
a flight time acquisition unit acquiring flight times of a clock signal and a data strobe signal transmitted to or from the memory, using a reflected wave on a transmission path of said signals;
a calculation unit determining a valid range of data to be synchronized with a system clock, based on the flight times of the clock signal and the data strobe signal acquired by said flight time acquisition unit;
a synchronizing unit synchronizing data in the valid range determined by said calculation unit; and
a differential bidirectional input/output unit being capable of skewing the output into high-impedance state and outputting said clock signal,
wherein said clock signal is composed of a set of a positive-logic clock signal and a negative-logic clock signal.

6. The semiconductor device according to claim 5, wherein said flight time acquisition unit comprises:
an observation time measuring unit observing the reflected wave on the transmission path of said signals, and measuring observation times; and
a flight time output unit acquiring the flight times of said clock signal and said data strobe signal, based on the observation times obtained by said observation time measuring unit, and using a prepared table or an equation showing correlation between said observation times and said flight times.

7. The semiconductor device according to claim 6, wherein said observation time measuring unit measures, as said observation times, the length of times ranging from output of search pulses on the transmission path of said signals to thereby skew said transmission path into a high-impedance state, up to detection of the reflected wave.

8. The semiconductor device according to claim 7, wherein periods ranging from output of said search pulse on said transmission path of said signals up to skewing of said transmission path into the high-impedance states is made controllable.

9. The semiconductor device according to claim 8, wherein said table or said equation showing correlation between said observation time and said flight time with respect to said clock signal is provided for every period ranging from output of said search pulse on said transmission path of said signal up to skewing of said transmission path into the high-impedance state.

10. The semiconductor device according to claim 8, wherein said table or said equation showing correlation between said observation time and said flight time with respect to said data strobe signal is provided for every period ranging from output of said search pulse on said transmission path of said signal up to skewing of said transmission path into the high-impedance state.

11. The semiconductor device according to claim 8, wherein the reflected wave of the signals on the transmission path is observed under varied periods ranging from output of said search pulse on said transmission path of said signals up to skewing of said transmission path into the high-impedance state, and an input/output unit of the signals is controlled during the normal operation, based on a timing corresponded to a period showing a low frequency of detection of the reflected wave.

12. A semiconductor device having an interface relevant to a double-data-rate memory, comprising:
a flight time acquisition unit acquiring flight times of a clock signal and a data strobe signal transmitted to or from the memory, using a reflected wave on a transmission path of said signals;
a calculation unit determining valid range of data to be synchronized with a system clock, based on the flight times of the clock signal and the data strobe signal acquired by said flight time acquisition unit; and
a synchronizing unit synchronizing data in the valid range determined by said calculation unit,
wherein said synchronizing unit captures and synchronizes data using the system clock masked depending on the valid range determined by said calculation unit.

13. A signal processing method for a semiconductor device having an interface relevant to a double-data-rate memory, comprising:
acquiring flight times of a clock signal and a data strobe signal transmitted to or from the memory, using a reflected wave on a transmission path of said signals;
calculating a round-trip delay for a reading operation from said memory, based on the flight times of the clock signal and the data strobe signal acquired;
determining a valid range of data to be synchronized when data is read out from said memory, using the round-trip delay calculated;
synchronizing the data according to the valid range determined;
wherein acquiring the flight times of the clock signal and the data strobe signal further comprises:
observing the reflected wave on the transmission path of said signals, and measuring observation times; and
outputting the flight times of said clock signal and said data strobe signal, based on the observation times obtained by the observation, and using a prepared table or an equation showing correlation between said observation times and said flight times.

* * * * *